United States Patent [19]
Sullivan et al.

[11] Patent Number: 4,573,388

[45] Date of Patent: Mar. 4, 1986

[54] PIZZA DOCKER

[75] Inventors: Norman D. Sullivan; Forrest E. Baker, both of Hollister, Calif.

[73] Assignee: Automated Portion Control Technology, Inc., Hollister, Calif.

[21] Appl. No.: 590,645

[22] Filed: Mar. 19, 1984

[51] Int. Cl.[4] .............................................. B26F 1/24
[52] U.S. Cl. ...................................... 83/867; 83/122; 83/660; 83/284; 83/665
[58] Field of Search ................ 83/867, 866, 122, 868, 83/592, 665, 660, 284, 698, 922, 926 E; 99/501, 504

[56] References Cited

U.S. PATENT DOCUMENTS

| | | | |
|---|---|---|---|
| 769,444 | 9/1904 | Meurell | 83/867 X |
| 3,375,743 | 4/1968 | Levy | 83/284 X |
| 3,747,447 | 7/1973 | Wisner | 83/867 |
| 3,880,069 | 4/1975 | Moline | 99/467 X |
| 3,969,458 | 7/1976 | Hunter | 83/867 X |

Primary Examiner—James M. Meister
Assistant Examiner—John L. Knogle
Attorney, Agent, or Firm—Claude A. S. Hamrick

[57] ABSTRACT

A pizza docker assembly including a motor driven shaft on which are mounted a plurality of docker wheels each including radially extending spines for perforating dough as it is passed therebeneath. The spines on adjacent docker wheels are offset to avoid forming a continuous line of spines and thereby reduce the tendency to lift the dough after it is perforated. A comb assembly attached to the docker assembly aids in separation of any dough lifted by the spines.

2 Claims, 5 Drawing Figures

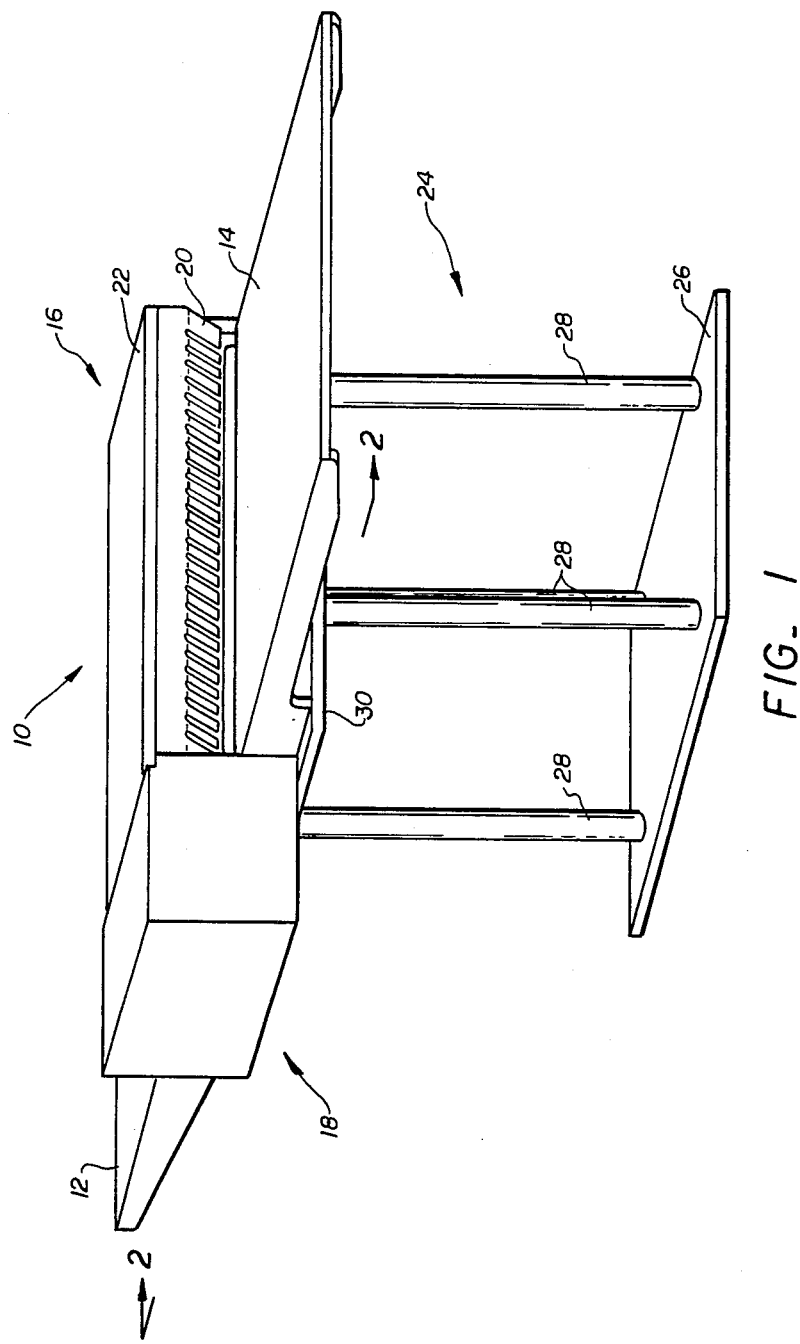

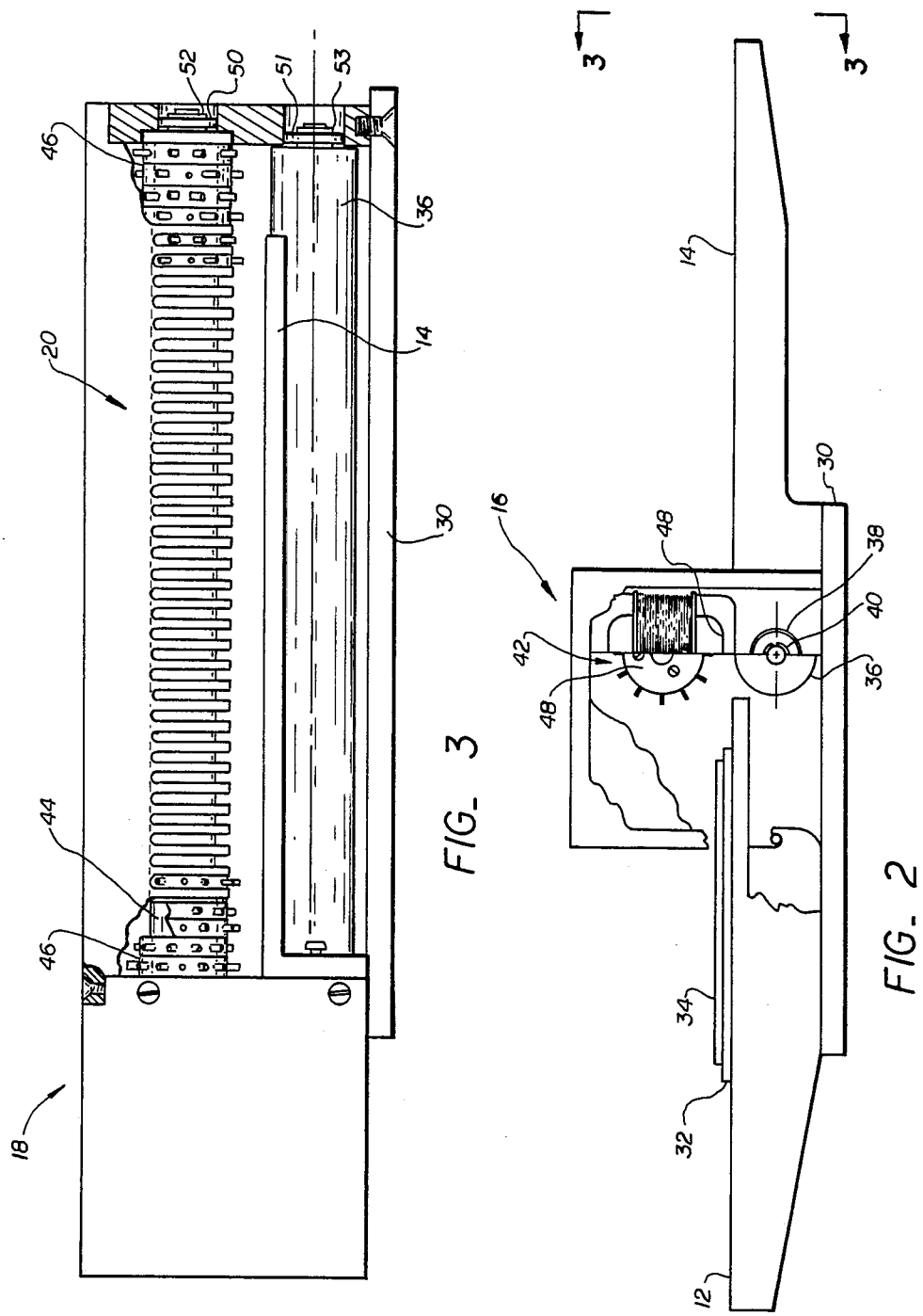

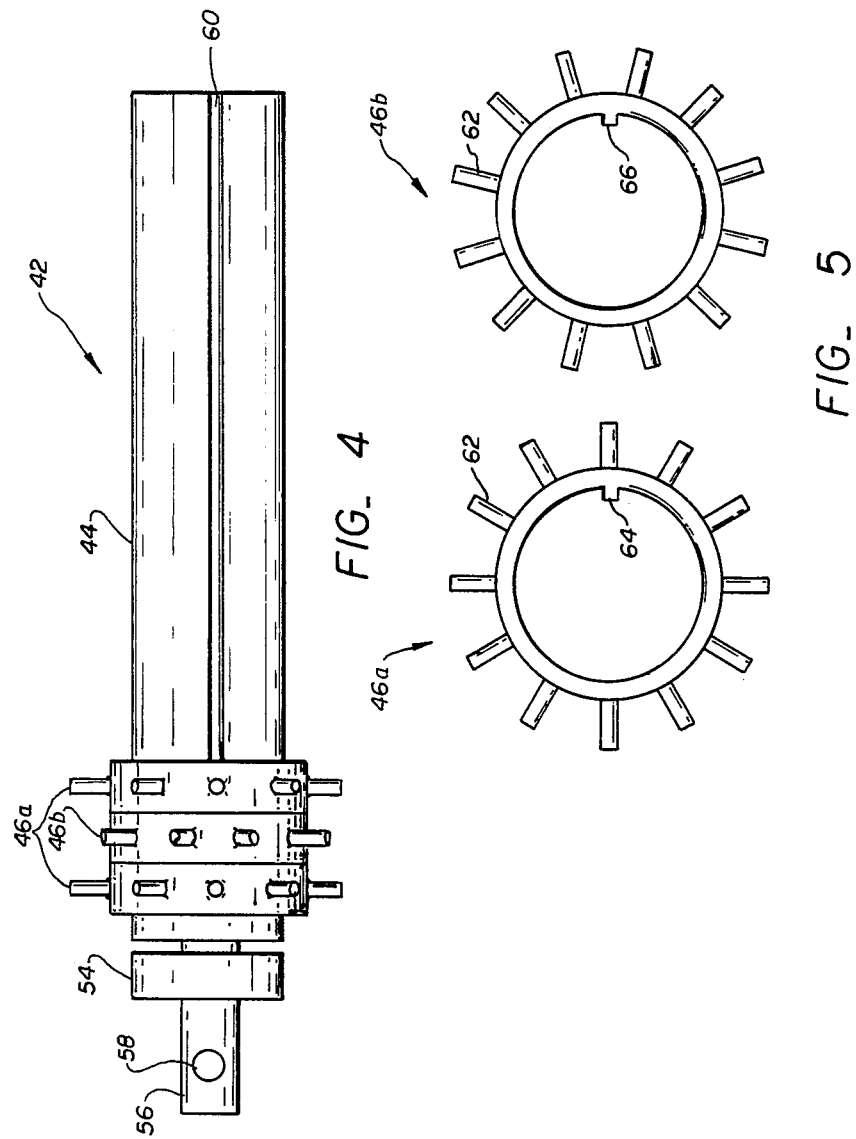

PIZZA DOCKER

BACKGROUND OF THE INVENTION

1. Field of the Invention

This invention relates generally to apparatus for perforating raw dough prior to cooking and more particularly, relates to apparatus for perforating pizza dough prior to cooking.

2. Description of the Prior Art

Machines for performing various operations on such items as raw potato chips, cracker dough and the forming of raviolis are well known in the art. U.S. Pat. No. 3,880,069 discloses an apparatus for forming pizza dough shells which includes, as best seen in FIGS. 7 and 8, a perforating roll 160 which is provided with a plurality of spikes 162 that serve to perforate the dough as it passes between the roll and the web 80. One of the problems associated with prior art devices has been the lifting up of the dough from a tray because the dough adheres to the spikes or spines of the perforator.

SUMMARY OF THE PRESENT INVENTION

It is a primary object of the invention to provide apparatus for perforating pizza dough prior to cooking.

It is a further object of the invention to provide a perforator from which the dough may be readily separated from the spines of the pizza docker.

It is yet another object of the invention to mount a plurality of docker wheels 46 on a drive shaft 44 so as to form a pizza docker 42 on which spines are spirally positioned about the periphery of said drive shaft.

Briefly, a preferred embodiment of the invention includes front and rear shelves and disposed intermediate thereof a pizza docker assembly. Pizza dough is spread out on a tray which is than passed along the front shelf to intersect with the pizza docker assembly. A motor drives a drive shaft on which a plurality of docker wheels, each including a number of spines, have been mounted and the spines perforate the pizza dough as they drive the dough through the pizza docker assembly. Comb means at the rear of the pizza docker assembly have broad fingers which extend downward to intersect with any portion of the pizza dough that may have adhered to and been lifted by any of the spines on the docker wheels.

IN THE DRAWING

FIG. 1 is a rear perspective view of a pizza docker assembly according to this invention and includes floor support assembly (24), a front shelf (12) and a rear shelf (14);

FIG. 2 is a partially broken sectional view along the line 2—2 of FIG. 1 and shows additional detail of the drive assembly (18), the pizza docker (42) and the tray (32) which carries the dough (34) to be perforated;

FIG. 3 is a partially broken section view along the line 3—3 of FIG. 2;

FIG. 4 is a side view of drive shaft (44) illustrating the drive connection, the docker wheels (46A and 46B) and guide slot (60) for the drive wheels; and FIG. 5 is a side view of docker wheels (46A and 46B) illustrating the radial spines (62) and the inline key (64) and offset key (66).

DETAILED DESCRIPTION OF THE PREFERRED EMBODIMENT

Referring now to FIG. 1, it may be seen that a perforation assembly 10 includes a front shelf 12, a rer shelf 14 and intermediate the front and rear shelves a pizza docker assembly 16 including a drive assembly 18 and a comb separator 20 which is connected to the pizza docker housing 22. The perforator assembly 10 is supported a convenient distance from the floor by floor support assembly 24 that includes base 26, a plurality of legs 28 and a top support 30 on which the perforator assembly 10 is attached.

Operation of the machine may be understood by reference to FIG. 2 in which a tray 32 including pizza dough 34 has been moved along front shelf 12 so as to be in a position to be supported by idler roller 36 that is mounted in bearing 38 which is held by retainer ring 40. Above the idler roller 36 is the pizza docker 42 that includes a drive shaft 44 on which are mounted a plurality of docker wheels 46. The drive shaft 44 is connected to drive motor 48 via extension 56 and aperture 58 (see FIG. 4). The docker wheels 46 are thus turned and the intersection of the spines 62, which extend radially outward from the docker wheels, pass through and perforate the pizza dough and intersect the upper surface of tray 32. This frictional engagement with the upper surface of tray 32 drives the dough and tray through the perforation assembly.

In order that the pizza dough will not be lifted a significant distance above the upper surface of tray 32 by a line of spines transverse to the direction of motion of the tray, the pizza docker 42 is specially design to avoid this common problem. As may be seen in FIG. 3, the idler roller 36 and the pizza docker 42 are aligned in parallel planes and sufficiently separated so that the spines 62 do not touch the idler roller 36. Rotational support for idler roller 36 is provided at one end by bearing 38, which is held in place by retaining ring 40; and by bearing 51 which is held in place by retaining ringe 53. From FIG. 3 it may be seen that the spines of adjacent docker wheels are offset one from the other and the manner in which this is accomplished is shown in FIGS. 4 and 5.

The pizza docker 42 is formed using drive shaft 44 and a plurality of docker wheels such as 46A and 46B. The construction of the docker wheels 46A and 46B is generally shown in FIG. 5. Of particular importance is the location of the key which mates with the alignment slot 60 of drive shaft 44. Note that the alignment key 64 is in line with a spine as shown in FIG. 5, whereas the alignment key 66 is disposed intermediate adjacent spines 62 as shown also in FIG. 5. In forming the pizza docker 42, the adjacent docker wheels are selected so as to not have the same position alignment key, i.e., the same inline key or offset key as shown, respectively, as 64 or 66 in FIG. 5. By alternating docker wheels 46A and 46B along drive shaft 44, the spines are not all aligned parallel with the drive shaft 44. This is graphically illustrated for the docker wheels shown in FIG. 4. Although not hown in detail, it is quite obvious that by so positioning the docker wheels they form a helical pattern about a drive shaft 44. Thus, the pizza docker 42 does not provide as strong a lifting force along a line parallel to the drive shaft 44 as is obtained by prior devices. Not only does this significantly reduce the lifting force, but it simplifies the separation of the pizza dough from the spine which is now readily accomplished by the comb separator 20.

As will be clear to those skilled in the art, modifications and changes may be made to the disclosed embodiments without departing from the inventive concepts thereof. The above description is intended as illustrative and informative, but not limiting in scope. Accordingly, it is intended that the following claims be interpreted to cover all modifications that reasonably fall within the scope of the invention.

What is claimed is:

1. Apparatus for perforating dough prior to baking, which comprises:
   a tray having an upper surface thereof for supporting said dough to be perforated;
   a front shelf adapted to support said tray in a horizontal condition prior to perforation of said dough;
   a rear shelf adapted to support said tray in a horizontal condition and in the same horizontal plane as said front shelf, subsequent to perforation of said dough;
   docker wheel means interposed between said front and rear shelves, said docker wheel means having a plurality of radially extending perforator spines which are of sufficient length to pass completely through the dough and touch said upper surface of said tray so that both tray and dough may be moved together, adjacent ones of said perforator spines being circumferentially displaced one from the other so as to form a plurality of spirals about the transverse axis of said docker wheel means, said docker wheel means including:
   drive shaft means including a drive shaft which has a guide slot in the periphery thereof, said guide slot extending along the length of and in parallel with the central axis thereof;
   a first docker wheel having a central aperture providing an inner surface with a diameter which is slightly larger than the outer diameter of said drive shaft, said docker wheel having an outer surface, a plurality of equally spaced perforator spines extending radially outward from said outer surface, and a key for matching engagement with said guide slot, said key being formed on said inner surface so as to be in alignment with one of said perforator spines, and
   a second docker wheel having a central aperture providing an inner surface with a diameter which is slightly larger than the outer diameter of said drive shaft, said docker wheel having an outer surface, a like plurality of equally spaced perforator spines extending radially outward from said outer surface, and a key for matching engagement with said guide slot, said key being formed on said inner surface so as to be intermediate a pair of adjacent perforator spines, a number of said first and second docker wheels being alternately placed adjacent one another along the axial length of said drive shaft whereby adjacent ones of said perforator spines are circumferentially displaced one from the other;
   rotatable means for supporting said tray in the horizontal plane of said front and rear shelves and disposed in the space therebetween said rotatable means including:
   an idler roller having its axis transverse to the direction of motion of the tray and positioned so as to hold said upper surface of said tray firmly against the spines; and
   bearing means for rotatably supporting said idler roller;
   means for rotating said docker wheel means, whereby the dough is simultaneously perforated and driven passed said docker wheel means; and
   means for separating said perforated dough from said perforator spines and including a housing covering said docker wheel means, and comb means attached to said housing, said comb means having fingers extending downwardly toward the upper surface of said back shelf so as to intersect the dough if it is lifted above said upper surface of said tray.

2. In a pizza docker which includes a front shelf and a rear shelf with docking means interposed therebetween, apparatus for perforating uncooked dough which comprises:
   a tray for supporting dough to be perforated;
   drive shaft means including a drive shaft which has a guide slot in the periphery thereof, said guide slot extending along the length of and in parallel with the central axis thereof;
   a first docker wheel having a central aperture providing an inner surface with a diameter which is slightly larger than the outer diameter of said drive shaft, said docker wheel having an outer surface, a plurality of equally spaced perforator spines extending radially outward from said outer surface, and a key for matching engagement with said guide slot, said key being formed on said inner surface so as to be in alignment with one of said perforator spines;
   a second docker wheel having a central aperture providing an inner surface with a diameter which is slightly larger than the outer diameter of said drive shaft, said docker wheel having an outer surface, a like plurality of equally spaced perforator spines extending radially outward from said outer surface, and a key for matching engagement with said guide slot, said key being formed on said inner surface so as to be intermediate a pair of adjacent perforator spines, and a number of said first and second docker wheels being alternately placed adjacent one another along the axial length of said drive shaft, whereby adjacent ones of said perforator spines are circumferentially displaced, one from the other so as to form a plurality of spirals about the periphery of said drive shaft; and means for separating perforated dough from said perforator spines including a housing covering said docker wheel means, and comb means attached to said housing, said comb means having fingers extending downwardly toward the upper surface of said back shelf so as to intersect the dough if it is lifted above said upper surface of said tray.

* * * * *